(12) United States Patent
Nigam et al.

(10) Patent No.: US 10,237,810 B2
(45) Date of Patent: Mar. 19, 2019

(54) METHOD AND APPARATUS FOR PROCESSING SYSTEM INFORMATION IN COMMUNICATION SYSTEM

(71) Applicant: Samsung Electronics Co., Ltd, Gyeonggi-do (KR)

(72) Inventors: Anshuman Nigam, Bangalore (IN); Jung-Soo Jung, Gyeonggi-do (KR); Sun-Heui Ryoo, Gyeonggi-do (KR); Jung-Min Moon, Gyeonggi-do (KR); Sung-Jin Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/115,651

(22) PCT Filed: Jan. 29, 2015

(86) PCT No.: PCT/KR2015/001005
§ 371 (c)(1),
(2) Date: Jul. 29, 2016

(87) PCT Pub. No.: WO2015/115856
PCT Pub. Date: Aug. 6, 2015

(65) Prior Publication Data
US 2017/0171797 A1    Jun. 15, 2017

(30) Foreign Application Priority Data
Jan. 29, 2014 (IN) .............................. 122/KOL/2014

(51) Int. Cl.
*H04W 48/12* (2009.01)
*H04W 68/00* (2009.01)
(Continued)

(52) U.S. Cl.
CPC ......... *H04W 48/12* (2013.01); *H04W 68/005* (2013.01); *H04W 68/02* (2013.01); *H04W 88/02* (2013.01); *H04W 88/08* (2013.01)

(58) Field of Classification Search
CPC ..... H04W 48/12; H04W 88/08; H04W 88/02; H04W 68/005; H04W 68/02
See application file for complete search history.

(56) References Cited

U.S. PATENT DOCUMENTS

| | | | |
|---|---|---|---|
| 8,934,926 B1 * | 1/2015 | Greenberg | H04W 4/08 |
| | | | 455/418 |
| 2009/0124245 A1 | 5/2009 | Somasundaram et al. | |
| | | (Continued) | |

FOREIGN PATENT DOCUMENTS

KR    10-2009-0096784    9/2009

OTHER PUBLICATIONS

International Search Report dated Apr. 28, 2015 in connection with International Application No. PCT/KR2015/001005; 6 pages.

*Primary Examiner* — Thai Nguyen

(57) ABSTRACT

The present disclosure relates to a pre-$5^{th}$-Generation (5G) or 5G communication system to be provided for supporting higher data rates beyond $4^{th}$-Generation (4G) communication system such as long term evolution (LTE). Provided is a method for processing System Information (SI) by a User Equipment (UE) in a mobile communication system. The method includes receiving, from a first base station (BS), information related to change of SI; and waiting for reception of changed SI based on the information.

6 Claims, 11 Drawing Sheets

(51) Int. Cl.
 *H04W 68/02* (2009.01)
 *H04W 88/02* (2009.01)
 *H04W 88/08* (2009.01)

(56) References Cited

U.S. PATENT DOCUMENTS

| | | |
|---|---|---|
| 2009/0181661 A1 | 7/2009 | Kitazoe et al. |
| 2012/0099464 A1 | 4/2012 | Chun et al. |
| 2013/0343270 A1 | 12/2013 | Abe et al. |
| 2016/0073326 A1* | 3/2016 | Vannithamby ........ H04W 4/005 370/312 |

* cited by examiner

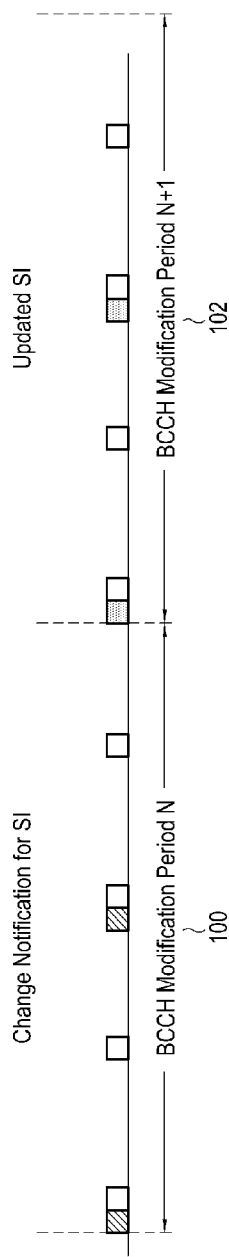
[Fig. 1]

[Fig. 2]
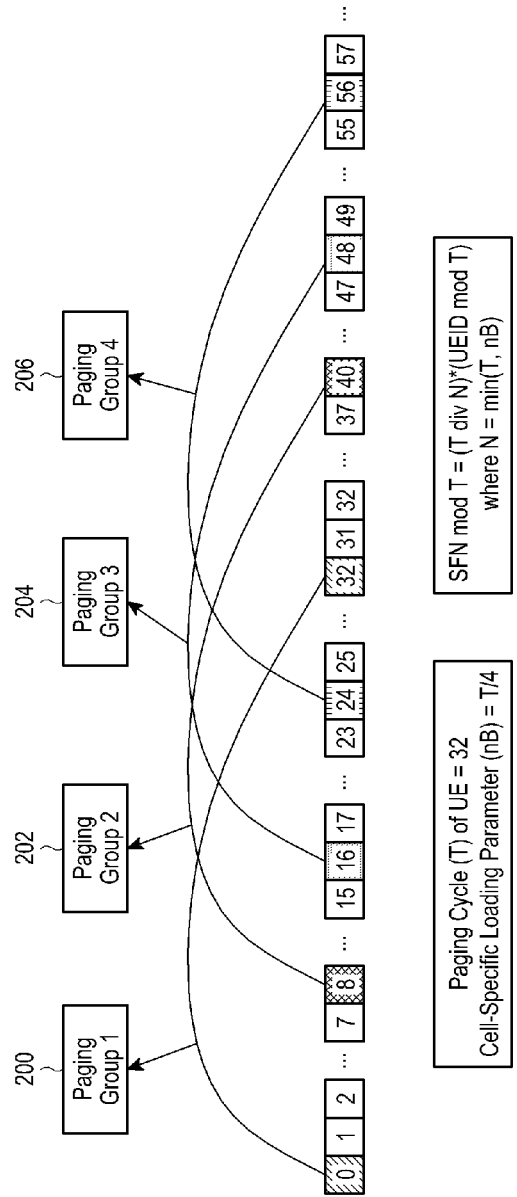

[Fig. 3a]
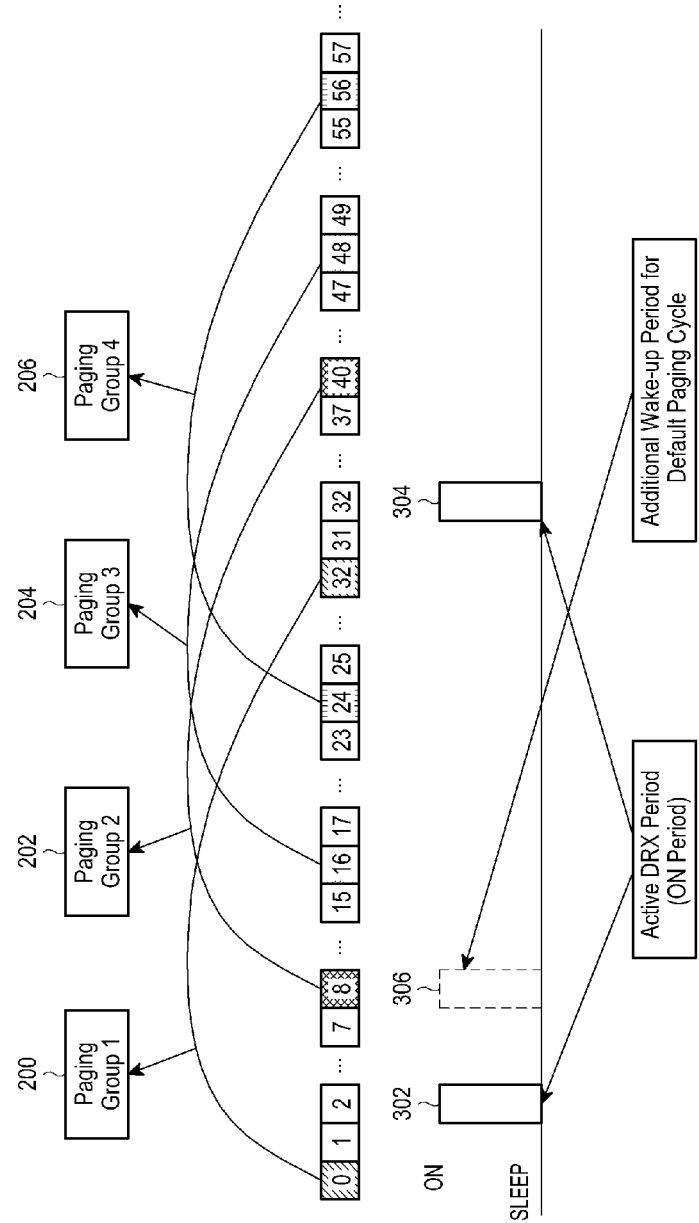

[Fig. 3b]
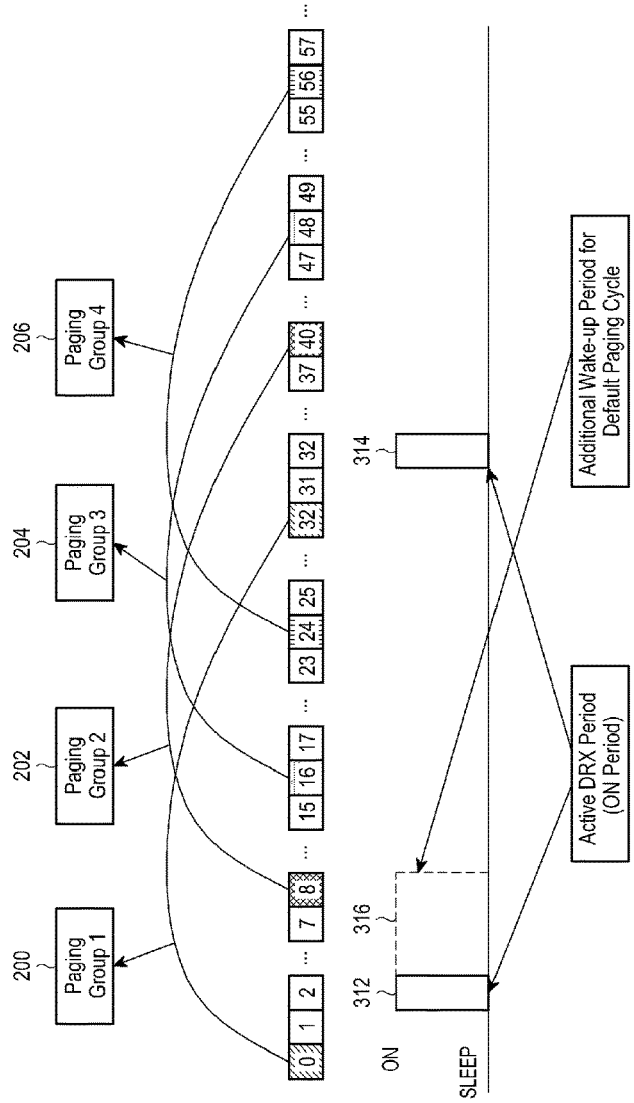
[Fig. 4]
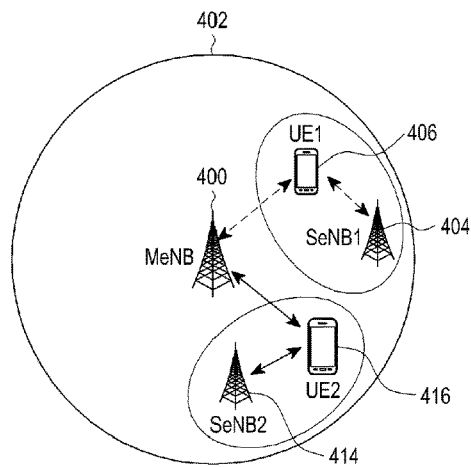

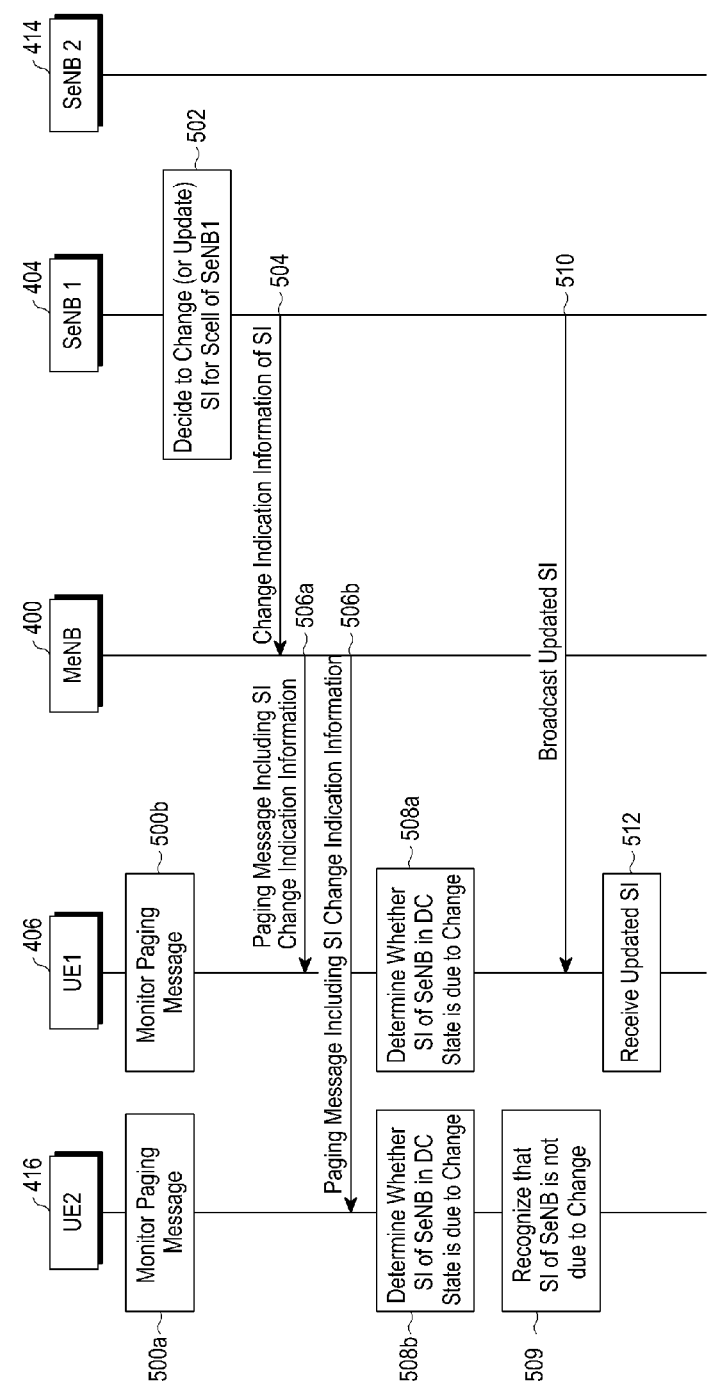

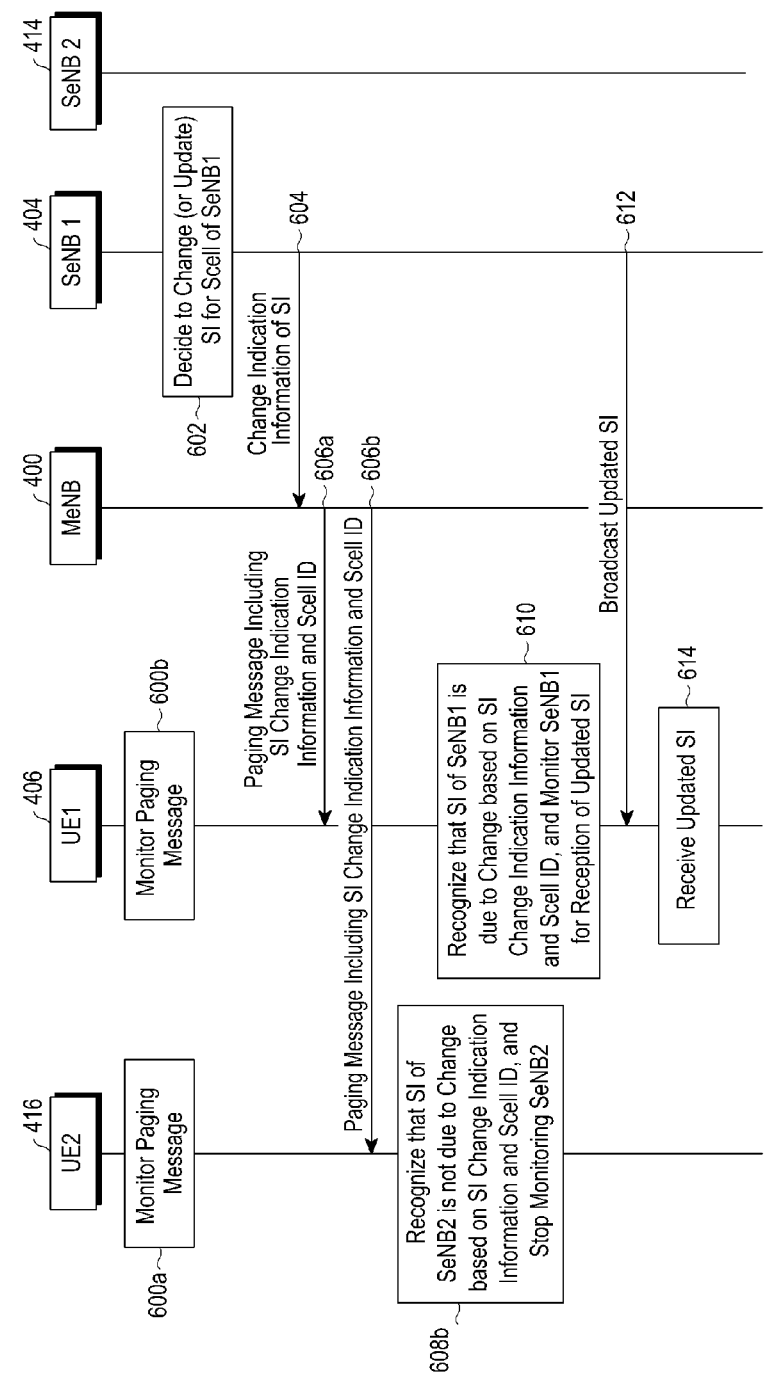
[Fig. 6]

[Fig. 7]
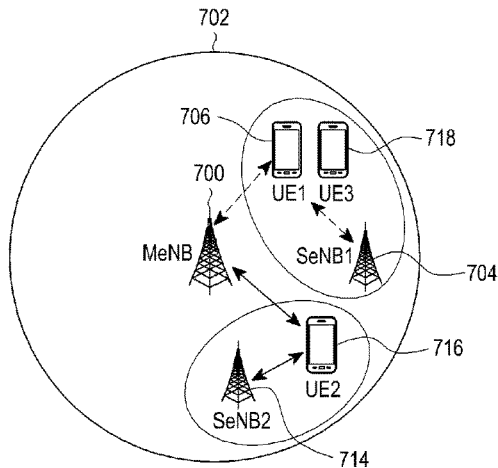
[Fig. 8a]
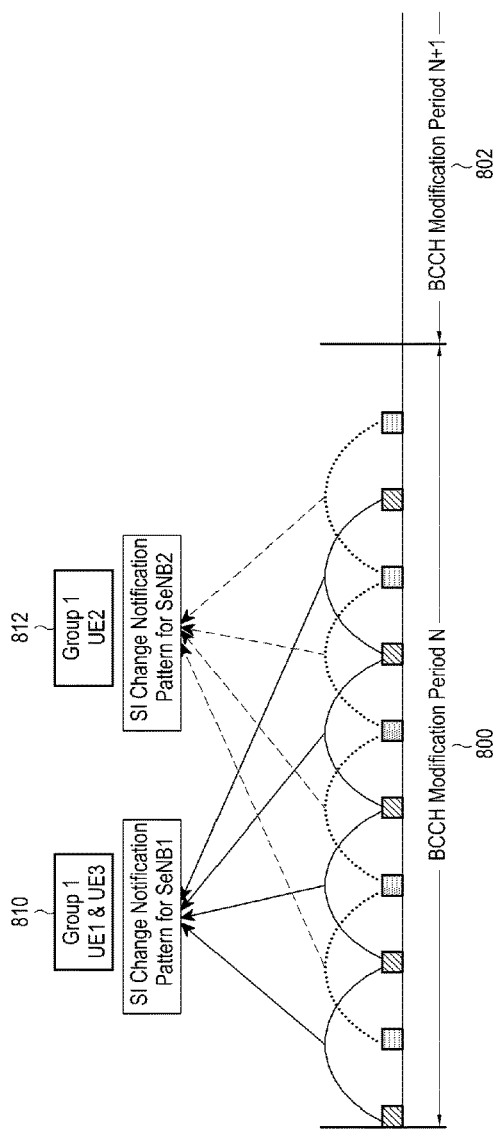

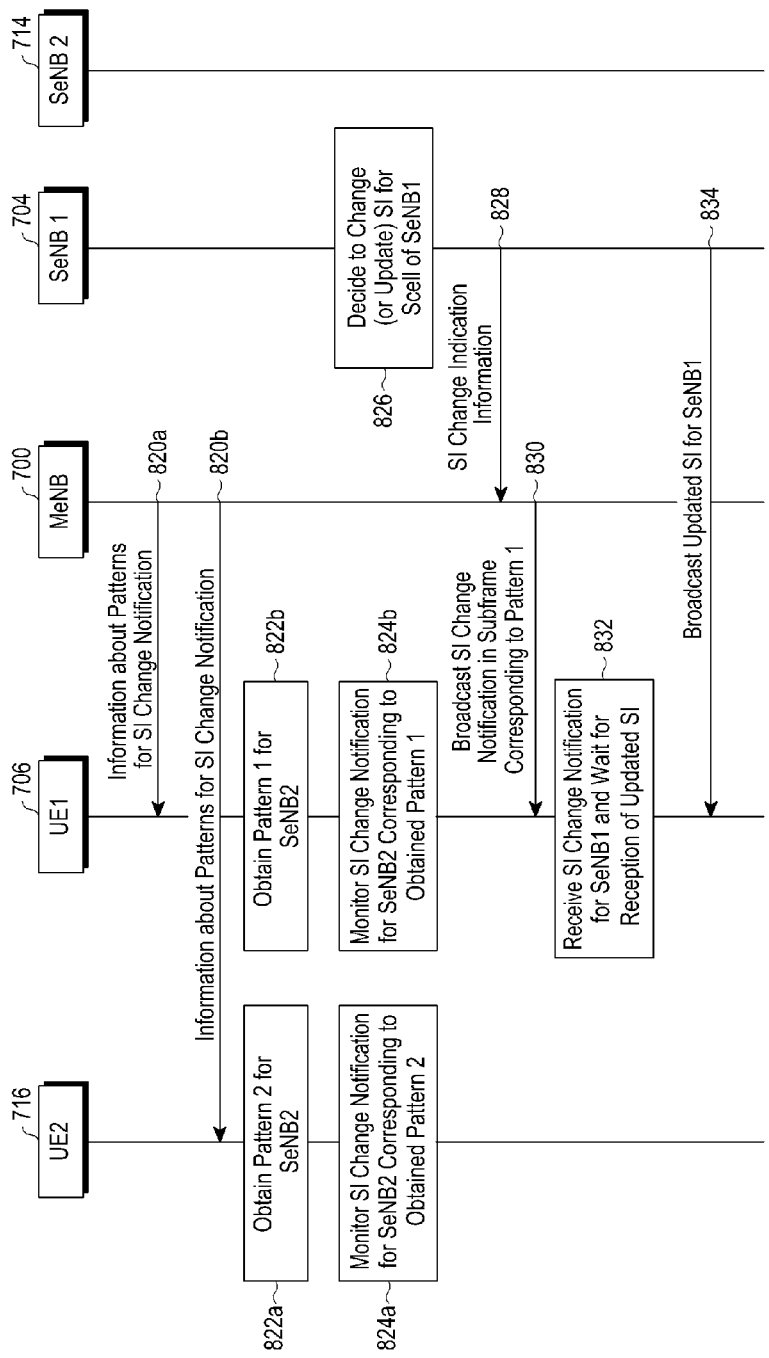
[Fig. 8b]

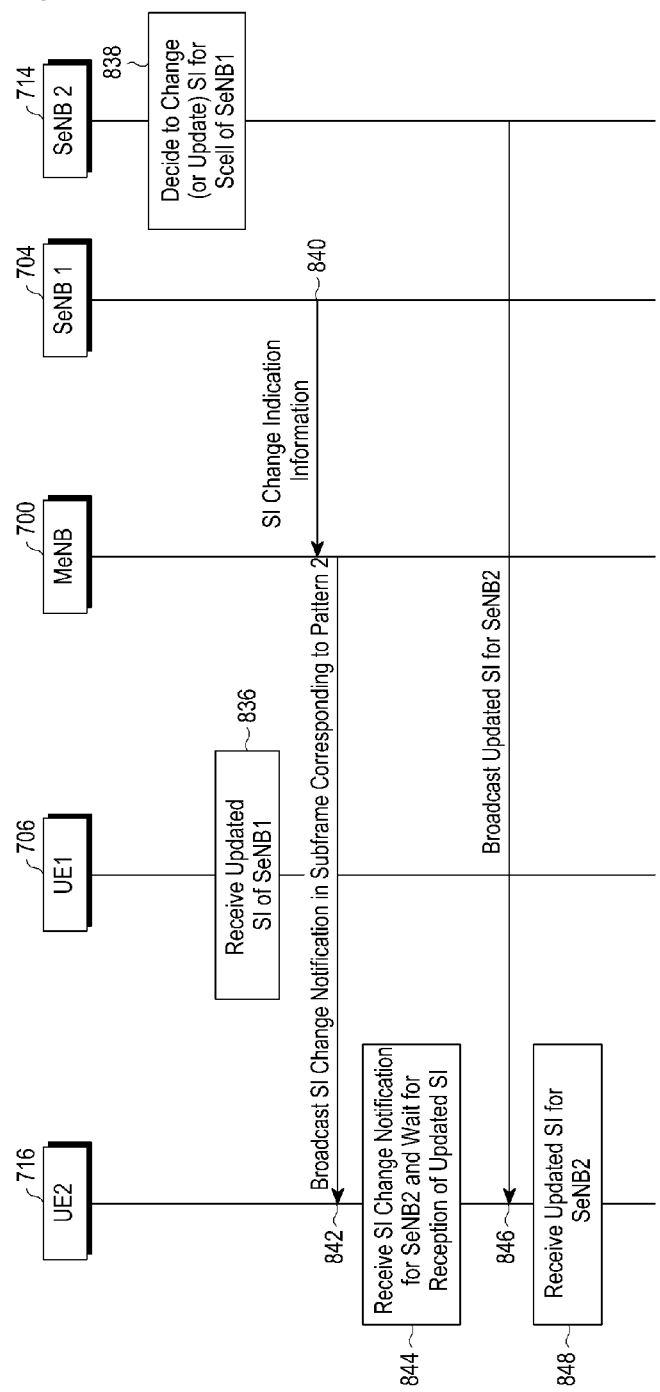
[Fig. 8c]

[Fig. 9]
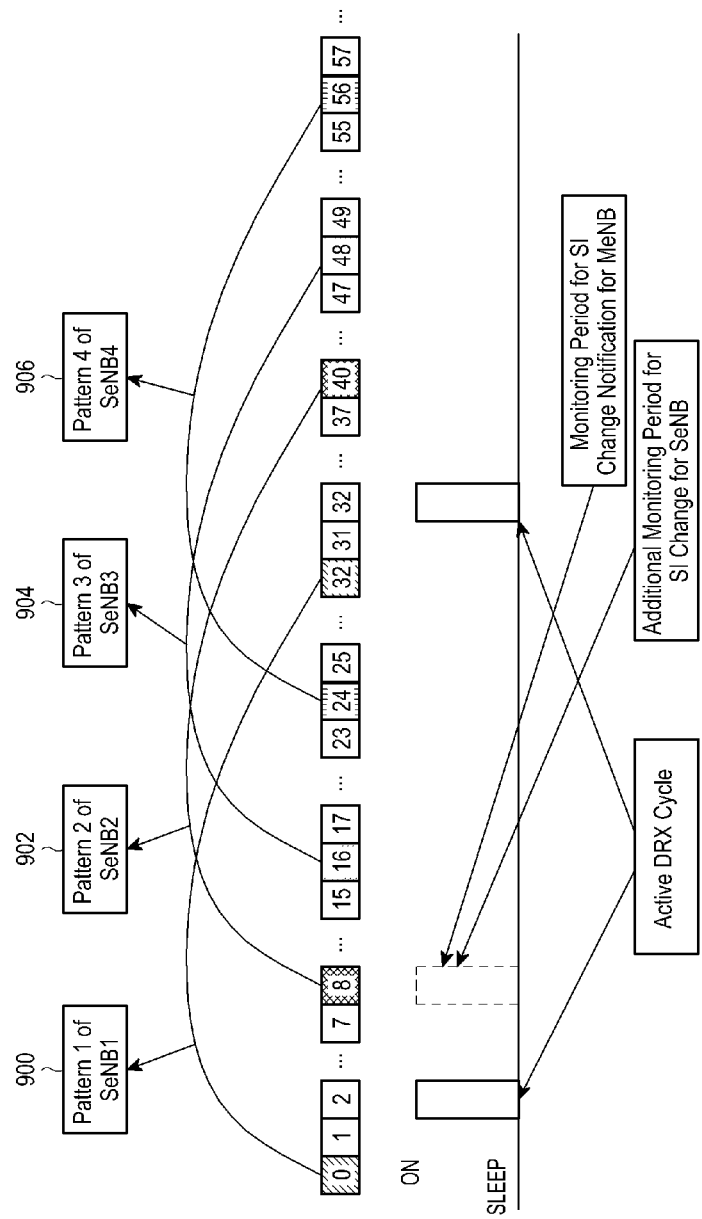
[Fig. 10]
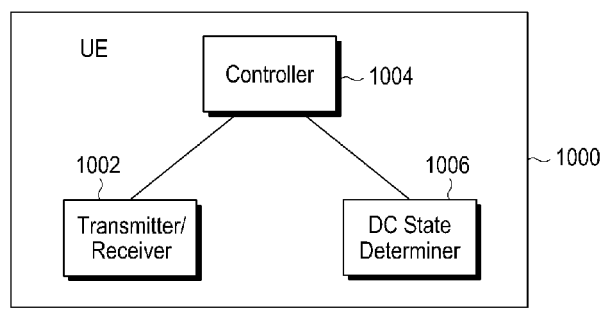

[Fig. 11]
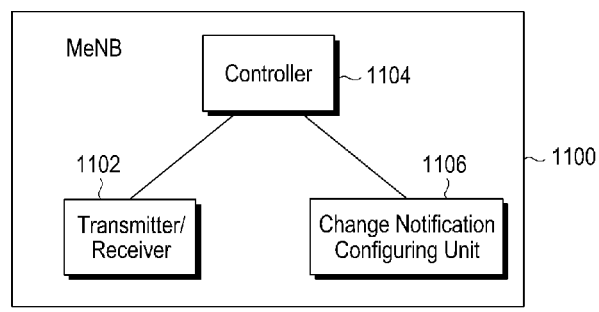
[Fig. 12]
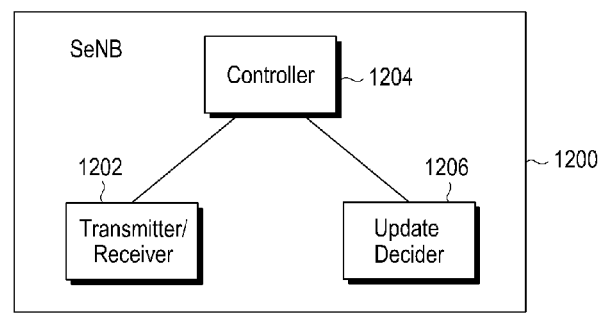

METHOD AND APPARATUS FOR PROCESSING SYSTEM INFORMATION IN COMMUNICATION SYSTEM

PRIORITY

This application is a National Phase Entry of PCT International Application No. PCT/KR2015/001005, which was filed on Jan. 29, 2015, and claims a priority to Indian Patent Application No. 122/KOL/2014, which was filed on Jan. 29, 2014, the contents of which are incorporated herein by reference.

TECHNICAL FIELD

The present disclosure relates to a method and apparatus for processing System Information (SI) in a communication system.

BACKGROUND

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Due to an increase in communication capacity, mobile communication systems have employed various techniques, such as Carrier Aggregation (CA) for transmitting and receiving data through multiple cells, Dual Connectivity (DC) for providing data boosting using a macro cell and multiple pico cells, and so forth.

The above information is presented as background information only to assist with an understanding of the present disclosure. No determination has been made, and no assertion is made, as to whether any of the above might be applicable as prior art with regard to the present disclosure.

SUMMARY

The present disclosure has been made to at least partially solve, alleviate, or remove at least one of problems and/or disadvantages described above.

Accordingly, various aspects of the present disclosure provide a method and apparatus for processing System Information (SI) in a mobile communication system.

Various aspects of the present disclosure also provide a method and apparatus for providing an SI change or update notification in a dual-connectivity-based mobile communication system.

Other objects to be provided in the present disclosure may be understood by embodiments described below.

According to an aspect of the present disclosure, there is provided a method for processing System Information (SI) by a User Equipment (UE) in a mobile communication system, the method including receiving, from a first base station (BS), information related to change of SI; and waiting for reception of changed SI based on the information.

According to another aspect of the present disclosure, there is provided a method for processing SI by a first BS in a mobile communication system, the method including receiving change notification of the SI from at least one second BS providing dual connectivity (DC), together with the first BS, to user equipments (UEs) located in a service coverage of the first BS; and broadcasting a paging message comprising change indication information of the SI.

According to another aspect of the present disclosure, there is provided a method for processing SI by a second BS in a mobile communication system, the method delivering change indication information of the SI to a first BS, if deciding to change the SI; and changing and transmitting the SI, wherein the second BS is located in a service coverage of the first BS and provides dual connectivity (DC) to at least one user equipment (UE) located in the service coverage, together with the first BS.

According to another aspect of the present disclosure, there is provided a UE for processing SI in a mobile communication system, the UE including a transceiver configured to receive from a first base station (BS), information related to change of the SI; and a controller configured to control the receiver to wait for reception of changed SI based on the information.

According to another aspect of the present disclosure, there is provided a first BS for processing SI in a mobile communication system, the first BS comprising a transceiver is configured to receive change notification of SI from at least one second BS providing dual connectivity (DC), together with the first BS, to at least one user equipment (UE) located in a service coverage of the first BS; and a controller configured to control the transceiver broadcasting a paging message comprising change indication information of the SI.

According to another aspect of the present disclosure, there is provided a second BS for processing SI in a mobile communication system, the second BS comprising a transceiver configured to deliver change indication information of the SI to a first BS, if deciding to change the SI; and a controller configured to change and transmitting the SI, wherein the second BS is located in a service coverage of the first BS and provides dual connectivity (DC) to at least one user equipment (UE) located in the service coverage, together with the first BS.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of embodiments of the present disclosure will be more apparent from the following detailed description taken in conjunction with the accompanying drawings, in which:

FIG. 1 illustrates an example of an operation in which a legacy enhanced nodeB (eNB) transmits updated SI;

FIG. 2 illustrates an example of general paging cycle and frames;

FIGS. 3a and 3b illustrate examples in which a User Equipment (UE) in a connected mode receives an Active Mode DRX mode-based paging message;

FIG. 4 illustrates an example of a communication system for providing a DC according to an embodiment of the present disclosure;

FIG. 5 illustrates an example of an operation flow of an SI change notification according to an embodiment of the present disclosure;

FIG. 6 illustrates an example of an operation flow of an SI change notification according to another embodiment of the present disclosure;

FIG. 7 illustrates another example of a communication system for providing a DC according to an embodiment of the present disclosure;

FIG. 8a illustrates an example of an SI change notification pattern according to another embodiment of the present disclosure;

FIGS. 8b and 8c illustrate an example of an operation flow of an SI update operation based on an SI change notification pattern according to another embodiment of the present disclosure;

FIG. 9 illustrates an example of an SI change notification pattern according to another embodiment of the present disclosure;

FIG. 10 illustrates an example of a UE according to an embodiment of the present disclosure;

FIG. 11 illustrates an example of an MeNB according to an embodiment of the present disclosure; and FIG. 12 illustrates an example of a SeNB according to an embodiment of the present disclosure.

Throughout the drawings, like reference numerals will be understood to refer to like parts, components, and structures.

DETAILED DESCRIPTION

Hereinafter, operating principles of exemplary embodiments of the present disclosure will be described in detail with reference to the accompanying drawings. Like components are referred to as like reference numerals although being shown in different drawings, and a detailed description of well-known functions or structures will not be provided if it unnecessarily obscures the subject matter of the present disclosure. The following terms have been defined based on their functions in the present disclosure and may change according to users' or operators' intention or custom. Therefore, the definition of the terms should be made based on the specification.

Hereinafter, a Generation Partnership Project (GPP) Long Term Evolution (LTE) system will be used only for illustration for the sake of convenience, and embodiments of the present disclosure are equally applied to other mobile systems. For example, in a 3rd GPP (3GPP) LTE system, System Information (SI) is categorized as a block set known as System Information Blocks (SIBs) and transmitted. The SI is periodically transmitted with different periodicities for different SIBs. A special information block is defined as a Master Information Block (MIB) containing essential PHY information for receiving additional SI. SIB1 includes a value tag indicating a version of currently transmitted SI together with scheduling information of other SIBs.

Thus, a User Equipment (UE) receives an MIB which is transmitted at a pre-defined location and with pre-defined transmission parameters. The UE then receives SIB1 to obtain periodicities and scheduling information of the other SIBs. Thereafter, the UE receives the other SIBs based on the information received in SIB1.

When deciding to update the SI, the eNB broadcasts the update or change notification for the SI in a Broadcast Control Channel (BCCH) modification period and then from the next BCCH modification period, broadcasts the updated information. Hereinafter, 'update' and 'change' will be used as the same meaning.

FIG. 1 illustrates an example of an operation in which a legacy eNB transmits updated SI.

Referring to FIG. 1, the eNB sends the change notification for the SI (or the SI change notification) by using all the paging messages that the eNB sends in a BCCH modification period n 100. In this case, once receiving paging messages, UEs in Radio Resource Control (RRC)_IDLE and UEs in RRC_CONNECTED may come to know SI updated in the next BCCH modification period (n+1) 102. Although the UEs in RRC_IDLE are expected to receive the paging message, the UEs in RRC_CONNECTED may optionally decode the paging message to obtain the SI change notification. As the paging message including the SI change notification is broadcast, this may help the UEs to constantly monitoring the SIB1.

In 3GPP Carrier Aggregation (CA), the UE may be configured to transmit and receive data on multiple cells. Among the multiple cells, one cell may be configured as a Primary Cell (Pcell) while the other cells may be configured as Secondary Cells (Scells). The SI monitoring of the UE is done for Pcell only. For Scell, SI is given via dedicated signaling when adding the Scell. When SI changes for Scell, the SI is updated via an RRC Connection Reconfiguration message.

In a legacy 3GPP LTE system, the UE is given a paging cycle determined in advance in Idle Mode. For example, the paging cycle may be 32, 64, 128 or 256 frames. If a paging cycle is not given, then a default paging cycle which is broadcasted in SIB3 is used. A paging occasion frame is calculated by the UE, for example, based on Equation 1.

$$\text{SFN mod } T = (T \text{ div } N) * (\text{UEID mod } T) \quad (1),$$

where T represents a paging cycle, N represents min(T, nB), and nB represents a cell specific loading parameter broadcast in SIB2. Based on Equation 1, each paging cycle may be configured with subframes as given in Equation 2. That is, a subframe unit forming a paging cycle may be 1, 2, 4, 8, 16, and 32 sub frames.

0, 1, 2, 3, 4, . . . All Frames 0, 2, 4, . . .

0, 4, 8, 12, . . .

0, 8, 16, . . .

0, 16, . . .

0, 32, 64, . . . , 256. (2)

A subframe forming a paging cycle is decided by parameters N, and paging subframes are predefined, such that one of configurations of Equation 3 may be used.

Subframe 9

Subframe 4 & 9

Subframe 0, 4, 5, 9 (3)

FIG. 2 illustrates an example of general paging cycle and frames.

Referring to FIG. 2, for example, a total of four paging groups are illustrated which satisfy conditions that a paging cycle T of a UE is 32 and a cell specific loading parameter nB is T/4. More specifically, Paging Group 1 200 includes 0th subframe and 32nd subframe. Paging Group 2 202 includes 8th subframe and 40th subframe. Paging Group 3 204 includes 16th subframe and 48th subframe. Paging Group 4 206 includes 24th subframe and 56th subframe.

The UE in the connected mode (or connected mode UE) may operate based on an Active Mode Discontinuous Reception (DRX) mode to reduce power consumption. In the Active Mode DRX mode, the UE is configured with a cycle of ON/OFF periods in which data communication happens in the ON period. In such a situation, a paging frame/subframe may or may not fall during the ON duration. FIGS. 3a and 3b illustrate examples in which the connected mode UE receives an Active Mode DRX mode-based paging message. Referring to FIGS. 3a and 3b, assuming that the UE cannot receive any paging during its ON period, the UE may further use a default paging cycle in addition to DRX-based ON periods 302 and 304. In this case, the UE may additionally wake up in a default paging period 306 corresponding to the default paging cycle. According to another embodiment, the UE may monitor all possible paging frames. Referring to FIG. 3B according to another embodiment of the present disclosure, the UE may monitor a frame 316 nearest to an ON period 312 for monitoring a SI change notification. According to another embodiment of the present disclosure, the UE may ignore the SI change notification monitoring the paging message and instead may continuously monitor SIB1 for detecting SI version change. All these methods cause complexity at the UE.

A UE based on Dual Connectivity (DC) which is being standardized may simultaneously be connected to eNB (MeNB) of a macro cell and a Secondary eNB (SeNB) of a pico cell. The primary motivation of dual connectivity is data boosting by using a large number of picocells in hotspots. But this leads to highly decreased mobility robustness as the UE may need to perform frequent handovers due to small size of the picocells. In order to overcome this issue, the architecture of DC is used in which the mobility is handled by the umbrella macrocell. In this new architecture of DC, a UE may be allocated an uplink data channel in both the MeNB and the SeNB. The MeNB is considered as a controller for many control plane functionalities, but the data plane is largely independently performed in each eNB. The main reason being that an inter eNB communication delay is much higher than the typical scheduling interval. The inter eNB communication incurs a delay of 2-60 ms which is higher than a scheduling delay of about 1 ms. Hence, the eNB performs its own scheduling. The eNB performing its own scheduling may also be considered as Inter-eNB Carrier Aggregation. Further in DC, cells served by the MeNB are referred to as a Pcell group and one of cells of the Pcell group of the MeNB is defined as a Pcell. Cells served by the SeNB are referred to as a Scell group and one of cells included in the Scell group is defined as a Pcell of the Scell group, which will be referred to as a pScell.

Several methods are under discussion for the update of the SI of the SeNB. First, the update of the SI of the SeNB may be handled in the same manner as legacy CA. In this case, in the same manner as legacy CA, SI for all cells included in the SeNB, that is Scells and pScells, is delivered to the UE through the Pcell of the MeNB. SI for other cells is provided to the UE through the Pcell through dedicated signaling. However, one macro cell may be related to multiple pico cells, such that this first method increases interaction between eNBs that become more relevant to each other in DC. In this situation, the Pcell of the MeNB needs to ensure communication of SI change for all relevant cells to corresponding UEs.

The second method is to independently handle the SI. In this case, the UE independently monitors SI of the MeNB and SeNB cells. SI handling in the second method is performed in each eNB, which means that SI for all cells of the SeNB, that is, Scells and pScell, is broadcast to the UE through the pScell of the SeNB and SI for all Scells of the MeNB is broadcast to the UE through the Pcell of the MeNB. This second method increases complexity at the UE because the UE needs to independently monitor SI for the MeNB and SI for the SeNB and to track the SI change for the MeNB and SeNB cells. In addition, as the UE first needs to receive SIB1 and SIB2, it may take additional time to add SeNB (pScell). Therefore, a need exists for a DC-based SI handling method for reducing load increased by the use of the first method and UE complexity increased by the use of the second method.

Hence, an embodiment of the present disclosure proposes a method for efficiently handling SI in a DC-based mobile communication system.

FIG. 4 illustrates an example of a communication system for providing a DC according to an embodiment of the present disclosure.

Referring to FIG. 4, for example, it is assumed that two SeNBs 404 and 414, UE1 406, and UE2 416 exist in a cell 402 of MeNB 400. Then, UE1 406 is in a Dual Connectivity (DC) state with MeNB 400 and SeNB1 404 and UE2 416 is in a DC state with MeNB 400 and SeNB2 414. A UE according to another embodiment of the present disclosure and another UE in a non-DC state in a Scell of a DC-state SeNB may exist.

Hereinafter, in an embodiment of the present disclosure, a change notification for SI of a SeNB Scell is broadcast to UEs through a MeNB Pcell. It is assumed that a SeNB cell in a MeNB decides to change SI. Then, the SeNB delivers a change notification for the SI to the MeNB, and the MeNB incorporates the SI change notification into paging messages to be transmitted in a corresponding BCCH modification period. UEs having received the SI change notification for the Scell from the SeNB monitors SIBs for the Scell of its SeNB in the DC state in the next BCCH modification period. The UE monitors the SI for cells of the MeNB and obtains SI for all Scells of the MeNB through the Pcell of the MeNB. According to an embodiment of the present disclosure, the change notification incorporated into the paging messages by the MeNB indicates change of SI of the SeNB only, and the change notification may be indicated by, for example, an 1-bit indicator. Thus, the change notification does not indicate an identifier of the SeNB whose SI is due to change. Thus, upon receiving a paging message from the MeNB, the connected mode UEs the paging message and determine whether the paging message includes the change notification. If determining that the received paging message includes the change notification, the UEs monitor all Scells of the SeNB which is in the DC state with the UEs or pScell of the SeNB, because the UEs cannot identify the SeNB whose SI is due to change.

Substantially, even if SI for one Scell has changed, all connected mode UEs which are in the DC state with one cell of the MeNB as a Pcell may monitor the pScell of the MeNB in the DC state with the UEs to determine whether the SI has changed. The UEs decode SIB1 of the corresponding SeNB to match the current version of the SI with the version of the stored SI. If the stored version and the current version are different, the UEs may recognize that the SI of the SeNB has changed or has been updated.

FIG. 5 illustrates an example of an operation flow of an SI change notification according to an embodiment of the present disclosure. For convenience, a description will be made based on the communication system illustrated in FIG. 4.

Referring to FIG. 5, according to an embodiment of the present disclosure, a change notification for SI for a Scell of a SeNB is broadcast to UEs through a Pcell of a MeNB. Thus, in operations 500a and 500b, each of the UE2 416 and the UE1 406 monitors a paging message broadcast through the Pcell of the MeNB.

In operation 502, it is assumed that the SeNB1 404 decides to change (or update) the SI for its Scell. Then, in operation 504, the SeNB1 404 delivers the SI change notification to the MeNB 400. The change notification according to the embodiment illustrated in FIG. 5 is indication information indicating the change of the SI. In operations 506a and 506b, the MeNB 400 broadcasts the change notification through the paging message. Thus, in operations 506a and 506b, each of the UE1 406 and the UE2 416 receives the paging message. The change notification in the paging message is merely indication information indicating the change of the SI, and does not include identification information of a SeNB whose SI is due to change. Thus, each of the UE1 406 and the UE2 416 recognizes that the SI that is due to change is to be generated, by decoding the received paging message. To identify the SeNB of the SI that is due to change, in operation 508a, the UE1 406 decodes SIB1 of the SeNB1 404 which is in the DC state with the UE1 406. Then, the UE1 406 determines whether the current SI version obtained through the SIB1 matches the stored SI version. Assuming that the current SI version does not match the stored SI version, the UE1 406 recognizes that the SI of the SeNB1 404 is due to change. The SeNB1 404 broadcasts updated SI at preset intervals in operation 510, and the UE1 406 receives the updated SI in operation 512.

In operation 508b, to identify the SeNB whose SI is due to be updated, the UE2 416 decodes SIB1 of the SeNB2 414 which is in the DC state with the UE2 416, to determine whether the obtained current SI version matches the stored SI version. In operation 509, the UE2 416 monitors the SI of the SeNB2 414, and if determining that the current SI version matches the stored SI version, recognizes that the SI of the SeNB2 414 is not due to change.

In another embodiment of the present disclosure, the SI change notification for the SeNB Scell is broadcast to UEs through the Pcell of the MeNB. In this case, the SI change notification included in the paging message broadcast by the MeNB includes a Scell ID of a SeNB whose SI is due to be updated. The paging message according to another embodiment of the present disclosure may include new fields for identifying a Scell of a SeNB whose SI is due to be updated. Thus, the UE having received the paging message according to another embodiment of the present disclosure may identify the Scell of the SeNB whose SI is due to be updated. UEs which are in the DC state with the identified SeNB receive the SI broadcast from the identified SeNB in the next BCCH modification period. The paging message according to another embodiment of the present disclosure includes additional information corresponding to the Scell ID whose SI is due to be updated, such that overhead may be increased when compared to the paging message according to an embodiment of the present disclosure. On the other hand, only UEs in the DC state with the SeNB corresponding to the Scell ID perform monitoring, thereby preventing other UEs from unnecessarily monitoring the updated SI.

FIG. 6 illustrates an example of an operation flow of an SI change notification according to another embodiment of the present disclosure. For convenience, operations illustrated in FIG. 6 will be described based on the communication system illustrated in FIG. 4.

Referring to FIG. 6, according to another embodiment of the present disclosure, the SI change notification for the Scell of the SeNB is broadcast to UEs through the Pcell of the MeNB. Thus, in operations 600a and 600b, each of the UE2 416 and the UE1 406 monitors the paging message broadcast through the Pcell of the MeNB to obtain the SI change notification.

In operation 602, it is assumed that the SeNB1 404 decides to change (or update) the SI for its Scell. In operation 604, the SeNB1 404 delivers the SI change notification to the MeNB 400. In operations 606a and 606b, the MeNB 400 broadcasts the change notification through the paging message. Herein, the change notification according to an embodiment illustrated in FIG. 6 includes the Scell ID corresponding to the SI which is due to be updated, that is, the Scell ID of the SeNB1 400, together with indication information indicating the SI change. In operation 608, the UE2 416 recognizes that the SI of the SeNB2 414, which is in the DC state with the UE2 416, is not due to change through the indication information and the ID of the Scell which are included in the paging message, and stops monitoring the updated SI of the SeNB2 414.

In operation 610, the UE1 406 recognizes that the SI of the SeNB1 404, which is in the DC state with the UE1 406, is due to change through the indication information and the Scell ID, which are included in the paging message, and the UE1 406 monitors the updated SI of the SeNB1 404. In operation 612, the SeNB1 404 broadcasts the updated SI at preset intervals, and in operation 614, the UE1 406 receives the updated SI of the SeNB1 404.

In another embodiment of the present disclosure, connected mode UEs which maintain connection with the common MeNB Pcell are grouped together with UEs connected with the SeNB to which the connected mode UEs are connected. According to an embodiment of the present disclosure, a pattern for a SI change notification (or a SI change notification pattern) is defined per SeNB. The pattern includes pre-defined frames/subframes within a BCCH modification period of a MeNB Pcell where the UE may receive the SI change notification. The connected mode UEs connected with a SeNB monitor the SI change notification in the MeNB Pcell as per the corresponding SI change notification pattern for that SeNB. Thus, in an embodiment of the present disclosure, for connected mode UEs which are in dual connectivity through the same MeNB, the UEs associated with the same SeNB are grouped as one group. Thus, a UE group exists per SeNB and for each UE group, an SI change notification is monitored through a paging message broadcast from a Pcell of a MeNB corresponding to a SI change notification of a SeNB mapped to its group. For example, if a SeNB decides to change the SI for a Scell, the SeNB informs the MeNB of the SI change indication information. The MeNB then sends a SI change notification to the UE group of the SeNB through the frames/subframes corresponding to the SI change notification pattern per SeNB. The UEs having received the SI change indication information monitor the SI for all Scells of the SeNB connected with the UEs in the next BCCH modification period. In an embodiment of the present disclosure, UEs of the UE group connected with the SeNB receive the SI change indication information for the SeNB. Thus, even when the SI of one or more SeNBs in the DC state with the MeNB has changed for the UEs, the UEs do not perform unnecessary monitoring of the SI change for other SeNBs than the SeNB connected with the UEs.

FIG. 7 illustrates another example of a communication system for providing a DC according to an embodiment of the present disclosure.

Referring to FIG. 7, in a cell coverage of the SeNB1 704, a UE which is in the DC state with the MeNB 700 and the SeNB1 704, that is, UE3 718 exists in addition to the UE1 706. Herein, the UE3 718 exists in the cell coverage of the SeNB1 704, but is not connected with the MeNB 700. The UE2 716 exists in the cell coverage of the SeNB2 714 and dual connectivity is maintained between the MeNB 700 and the SeNB2 714.

FIG. 8*a* illustrates an example of an SI change notification pattern according to another embodiment of the present disclosure. For convenience, operations illustrated in FIGS. 8*b* and 8*c* will be described based on the communication system illustrated in FIG. 7.

Referring to FIG. 8*a*, in a BCCH modification period N, an SI change notification pattern is set differently for different SeNBs. First, a pattern 1 810 is a pattern for an SI change notification for a first group including the UE1 706 and the UE3 718, which are in the DC state with the MeNB 700 and the SeNB1 704, that is, the SeNB1 704 in the communication system illustrated in FIG. 7. A pattern 2 812 is a pattern for an SI change notification for a second group including the UE2 716 in the DC state with the MeNB 700 and the SeNB2 714, that is, the SeNB2 714 in the communication system illustrated in FIG. 7. The pattern 1 810 may include, for example, odd-number frames, that is, the first subframe, the third subframe, the fifth subframe, and the like, in a BCCH modification period N 800. The pattern 2 812 may include, for example, even-number frames, that is, the second subframe, the fourth subframe, the sixth subframe, and so forth, so as to be distinguished from the pattern 1 810.

FIGS. 8*b* and 8*c* illustrate an example of an operation flow of an SI update operation based on an SI change notification pattern according to another embodiment of the present disclosure. For convenience, operations illustrated in FIG. 8*b* will be described based on the communication system illustrated in FIG. 7.

Referring to FIGS. 8*b* and 8*c*, in operations 820*a* and 820*b*, the MeNB 700 configures UEs associated with the same SeNB among UEs in the DC state with the MeNB 700 as one group, assigns a pattern for a change notification of SI for a corresponding SeNB for each group, and broadcasts information about the pattern assigned for each group. Herein, the information about the pattern may be delivered, being mapped to a Scell ID of the SeNB. For example, if two groups exist as illustrated in FIG. 8*a* based on the communication system illustrated in FIG. 7, the pattern 1 810 of the group 1 may be delivered, being mapped to the Scell ID of the SeNB1 704, and the pattern 2 812 of the group 2 may be delivered, being mapped to the Scell ID of the SeNB2 714. Thus, in operation 822*a*, the UE2 716 obtains information of the pattern 2 812 mapped with the Scell ID of the SeNB2 714 in the DC state with the UE2 716 from the information about the pattern broadcast from the MeNB 700. In operation 824*a*, the UE2 716 monitors the SI change notification transmitted from the SeNB2 714 in subframes corresponding to the pattern 2 812, that is, even-number subframes, in the BCCH modification period N 800. Likewise, in operation 822*b*, the UE1 706 obtains information of the pattern 1 810 mapped to the Scell ID of the SeNB1 704 in the DC state with the UE1 706 from the information about the pattern broadcast from the MeNB 700. Then, in operation 824*b*, the UE1 706 monitors the SI change notification transmitted from the SeNB1 704 in subframes corresponding to the pattern 1 810, that is, odd-number subframes, in the BCCH modification period N 800.

In operation 826, it is assumed that the SeNB1 704 decides to change (or update) SI for its Scell. Then, in operation 828, the SeNB1 704 delivers a change notification for the SI to the MeNB 700. In operation 830, the MeNB 700 broadcasts the change notification through the paging message. The change notification according to an embodiment of the present disclosure is transmitted according to a pattern assigned to corresponding UEs based on a SeNB in the DC state with the MeNB 700, such that the change notification is transmitted corresponding to the first pattern 810 of the SeNB1 704. Thus, the change notification does not need to include identification information of the SeNB1 704 in addition to indication information indicating the SI change. As a result, in operation 832, the UE1 706, which monitors the SI change notification in subframes corresponding to the pattern 1 810 of the SeNB1 704, receives the change notification and waits for reception of the updated SI. Once the SeNB1 704 transmits the updated SI in a BCCH modification period (N+1) 802 in operation 834, the UE1 706 receives the updated SI in operation 836.

In operation 838, it is assumed that the SeNB2 714 decides to change (or update) SI of its Scell. In operation 840, the SeNB2 714 delivers a change notification for the SI of the MeNB 700. In operation 842*b*, the MeNB 700 broadcasts the change notification through the paging message. The change notification according to an embodiment of the present disclosure is transmitted according to a pattern assigned to corresponding UEs based on the SeNB in the DC state with the MeNB 700, such that the change notification is transmitted corresponding to the second pattern 810 of the SeNB2 714. Thus, the change notification does not need to include identification information of the SeNB2 714 in addition to the indication information indicating the SI change. As a result, in operation 844, the UE2 716, which monitors the SI change notification in subframes corresponding to the pattern 2 812 of the SeNB2 714, receives the change notification and waits for reception of the updated SI. Once the SeNB2 714 transmits the updated SI in the BCCH modification period (N+1) 802 in operation 846, the UE2 716 receives the updated SI in operation 846.

To sum up, if a pattern for a SI change notification per SeNB is used according to the embodiments illustrated in FIG. 6 through FIG. 8*c*, additional signaling for broadcasting information about patterns to UEs is generated and UEs need to be grouped based on the SeNB for management. However, by using a group and a pattern assigned for each group, monitoring of an SI change notification may be performed only by UEs assigned with the corresponding pattern.

A pattern for an SI change notification according to an embodiment of the present disclosure may be defined based on parameters signaled by an MeNB, that is, 'N' and 'm'. In this case, a subframe number for receiving a change notification for each pattern may be defined by, for example, a relationship "Modulo N=m". According to another embodiment of the present disclosure, the pattern for the SI change notification may be defined based on 'N' among parameters signaled by the MeNB. In this case, a subframe number for receiving a change notification for each pattern may be defined by, for example, a relationship "Modulo N=(SeNB ID)Modulo N".

According to another embodiment of the present disclosure, the SI change notification is transmitted through paging frames of a Pcell of a MeNB. In this case, a subframe number for receiving the SI change notification may be defined by, for example, a relationship "SFN mod T=(T div N) (SeNB_ID mod N)". Herein, 'T' and 'N' are parameters signaled by the MeNB to perform general paging operations.

FIG. 9 illustrates an example of an SI change notification pattern according to another embodiment of the present disclosure.

Referring to FIG. 9, for example, a parameter T may be set to a default paging cycle or a minimum value of a paging cycle, and a parameter N may be set to T/32. Thus, a pattern 1 900 of a SeNB1 starts from the 0th subframe, such that a SI change notification for the SeNB1 is transmitted second in the 32nd subframe. A pattern 2 902 of a SeNB2 starts from the 8th subframe, such that the SI change notification for the SeNB2 is transmitted second in the 40th subframe. A pattern 3 904 of a SeNB3 starts from the 16th subframe, such that a SI change notification for the SeNB3 is transmitted second in the 48th subframe. A pattern 4 906 of a SeNB4 starts from the 24th subframe, such that a SI change notification for the SeNB4 is transmitted second in the 56th subframe. In the embodiment illustrated in FIG. 10, only UEs of a group mapped to a corresponding SeNB monitor paging frames corresponding to an SI change notification pattern for the SeNB. This embodiment may also be applied to a case where SI change notifications for a MeNB are transmitted, thus further reducing complexity when compared to a case where a SI change notification is obtained by monitoring a general paging message.

According to another embodiment of the present disclosure, a change notification for SI may be configured in a new message format including a Scell ID of a SeNB that is due to update the SI. According to another embodiment of the present disclosure, the SI change notification may be configured to include 1 bit indicating whether the SI is due to change or not. A paging message according to another embodiment of the present disclosure may be re-used to signal the SI change notification. The paging message may include the Scell ID for the Scell of the SeNB whose SI is due to be updated, or may include a 1-bit indicator indicating whether the SI is due to change.

According to another embodiment of the present disclosure, an MIB of Scells of a SeNB is transmitted through a Pcell of a MeNB in a dedicated signaling manner. Alternatively, the MeNB may give an offset between its Pcell and an added Scell. For example, the offset may be given in RRC configuration messages along with the SI. The UE may then compute a System Frame Number (SFN) based on the SFN of the Pcell and the signaled offset.

According to another embodiment of the present disclosure, if the offset between the SFN of the Pcell of the MeNB and the Scell of the SeNB that is to be added is not known to the MeNB and the SeNB, then the SeNB may include a universal timestamp when delivering the MIB to the MeNB. In this case, the MeNB may update the SFN value according to a difference between the time when the MeNB is scheduled to send the MIB to the UE and the included timestamp and then send the updated MIB to the UE.

According to another embodiment of the present disclosure, a SI change notification pattern may be assigned in common to multiple SeNBs. If the number of SeNBs in a cell coverage of the MeNB is greater than a predetermined number, all SeNBs in a cluster may be grouped into one group and a common pattern may be assigned to this group. According to another embodiment, a BCCH modification period may not be aligned among eNBs. That is, if the BCCH modification period is set different among the eNBS, the pattern may be determined based on a short BCCH modification period. For example, it is assumed that the BCCH modification period of the SeNB may be set shorter than the BCCH modification period of the MeNB. Then, the SI change notification pattern may be set based on the BCCH modification period of the SeNB.

FIG. 10 illustrates an example of a UE according to an embodiment of the present disclosure.

Referring to FIG. 10, a UE 1000 may include a transmitter/receiver 1002, a controller 10104, and a DC state determiner 1006. Each component included in the UE 1000 may be divided into sub units or integrated into one unit according to an operator's intention or a corresponding embodiment. Herein, the UE 1000 is assumed to maintain the DC state with a MeNB and a particular SeNB located close to the UE 1000 among SeNBs located in a service coverage of the MeNB.

Once the transmitter/receiver 1002 receives a paging message, broadcast by the MeNB, according to an embodiment of the present disclosure, the controller 1004 decodes the paging message to obtain a change notification for SI of the SeNB. The change notification may be included as information indicating whether the SI is due to change or may include a Scell ID of the SeNB whose SI is due to change. If the SI change notification merely indicates whether the SI is due to change, the DC state determiner 1006 determines whether a current SI version matches a stored SI version by decoding a SIB1 of the currently connected SeNB, thus determining whether the SI is due to change. The controller 1004 controls the transmitter/receiver 1002 to wait for reception of the updated SI in the next BCCH modification period. The embodiment in which the change notification merely indicates whether the SI is due to change has already been described with reference to FIG. 5, and thus will not be described in detail at this time.

If the SI change notification includes the Scell ID of the SeNB, the DC state determiner 1006 determines whether the Scell ID of the SeNB matches the Scell ID of the SeNB with which the UE 1000 maintains the DC state. If the DC state determiner 1006 determines that the Scell ID of the SeNB matches the Scell ID of the SeNB, the controller 1004 controls the transmitter/receiver 1002 to wait for reception of the updated SI in the BCCH modification period. The embodiment in which the change notification further includes identification information of the SeNB whose SI is due to change has been already described with reference to FIG. 6, and thus will not be described in detail at this time.

According to another embodiment of the present disclosure, the transmitter/receiver 1002 may obtain pattern information broadcast from the MeNB according to another embodiment of the present disclosure. In this case, the controller 1004 obtains a pattern mapped to a Scell ID of its associated SeNB from the pattern information and controls the transmitter/receiver 1002 to receive the updated SI in a period corresponding to the pattern. Operations related to the pattern have been already described with reference to FIGS. 7 through 8*c*, and thus will not be described in detail at this time.

FIG. 11 illustrates an example of a MeNB according to an embodiment of the present disclosure.

Referring to FIG. 11, a MeNB 1100 may include a transmitter/receiver 1102, a controller, and a change notification configuring unit 1106. Each component included in the MeNB 1100 may be divided into sub units or integrated into one unit according to an operator's intention or a corresponding embodiment. Herein, the MeNB 1100 is assumed to provide DC to SeNBs located in its service coverage and a corresponding UE.

Once the transmitter/receiver 1102 determines that a SI change notification has been received from a SeNB, the controller 1104 controls the change notification configuring unit 1106 to configure the SI change notification that is due to be broadcast to the UE. The change notification configuring unit 1106 may configure a paging message including only information indicating whether the SI is due to change, or further including a Scell ID of the SeNB whose SI is due to change, under control of the controller 1104 according to each embodiment. Then, the transmitter/receiver 1102 broadcasts the paging message configured by the change notification configuring unit 1106 to UEs. According to an embodiment, the controller 1104 may group UEs associated with the same SeNB among UEs that are in the DC state with the MeNB 1100 and other SeNBs, into one group, and assign a different SI change notification pattern for a different group. The controller 1104 broadcasts information about the pattern to the UEs through the transmitter/receiver 1102. The information about the pattern may be delivered, being mapped to the ID of the corresponding SeNB.

FIG. 12 illustrates an example of a SeNB according to an embodiment of the present disclosure.

Referring to FIG. 12, a SeNB 1200 may include a transmitter/receiver 1202, a controller 1204, and a SI update decider 12106. Each element included in the SeNB 1200 may be divided into sub units or integrated into one unit according to an operator's intention or a corresponding embodiment. Herein, the SeNB 1200 is assumed to be one of SeNBs located in a service coverage of the MeNB and to maintain the DC state with the MeNB and a UE located close to the SeNB 1200.

If the SI update decider 1206 decides to change SI, the controller 1204 delivers a change notification for the SI to the MeNB through the transmitter/receiver 1202 in a predetermined BCCH modification period. The controller 1204 then controls the transmitter/receiver 1202 to deliver the updated SI to the MeNB in the next BCCH modification period.

A method and apparatus in which a UE receives a change notification of SI of a SeNB in a DC state with a MeNB and receives updated SI in a communication system according to an embodiment of the present disclosure, and the MeNB and the SeNB delivering the change notification of the SI of the SeNB and the updated SI to the UE may be implemented by hardware, software, or a combination of hardware and software. The software may be stored in a volatile or non-volatile memory device like a ROM irrespective of whether data is deletable or rewritable, in a memory like a RAM, a memory chip, a device, or an integrated circuit, or in a storage medium to which data can be recorded optically or magnetically and from which data can be read by a machine (e.g. a computer), such as a Compact Disc (CD), a Digital Versatile Disc (DVD), a magnetic disk, or a magnetic tape. The method for processing SI according to the present disclosure may be implemented by a computer or a portable terminal including a controller and a memory, and the memory may be an example of machine-readable storage media suitable for storing a program or programs including instructions implementing the embodiments of the present disclosure.

Accordingly, exemplary embodiments of the present disclosure include a program having a code for implementing the apparatus or method defined by the claims and a storage medium readable by a machine (for example, a computer) that stores the program. The program may be transferred electronically through a medium such as a communication signal transmitted via a wired or wireless connection, which and the equivalents of which are included in the exemplary embodiments of the present disclosure.

The UE according to an embodiment of the present disclosure may receive the program from an apparatus for delivering the change notification of the SI and the updated SI and store the received program. The program providing device may include a memory for storing a program including instructions for the UE to perform the method for processing SI according to the present disclosure and information necessary for the method for processing SI according to the present disclosure, a communication unit for performing wired or wireless communication with the UE, and a controller for transmitting the program to the UE automatically or at the request of the UE.

Other effects that may be obtained or estimated from the embodiments of the present disclosure are explicitly or implicitly disclosed in the detailed description of the embodiments of the present disclosure. That is, various effects expected according to the embodiments of the present disclosure are disclosed in the detailed description of the present disclosure.

While the present disclosure has been particularly shown and described with reference to exemplary embodiments thereof, various changes in form and detail may be made therein without departing from the spirit and scope of the present disclosure as defined by the following claims. Accordingly, the scope of the present disclosure will be defined by the appended claims and equivalents thereto. In addition, these modified embodiments should not be appreciated separately in a technical spirit or prospect of the present disclosure.

The invention claimed is:

1. A method for processing system information (SI) by a user equipment (UE) in a wireless communication system, the method comprising:
receiving, from a first base station (BS), information indicating a change of a SI of at least one second BS and an identifier related to the at least one second BS, the at least one second BS providing dual connectivity (DC) to the UE together with the first BS;
identifying, by the UE, the change of the SI of at least one second BS based on the information; and
receiving, from the at least one second BS, the SI of the at least one second BS corresponding to the identifier.

2. A method for processing system information (SI) by a user equipment (UE) in a wireless communication system, the method comprising:
receiving, from a first base station (BS), pattern information related to a predetermined time period, wherein the pattern information is mapped to a second BS, the second BS providing dual connectivity (DC) to the UE together with the first BS;
receiving, from the first BS, first information indicating a change of a SI of the second BS within the predetermined time period, based on the pattern information; and receiving the SI of the second BS based on the first information.

3. The method of claim 2,
wherein UE group comprises UEs, including the UE, connected to the second BS with the first BS,
wherein at least one another UE group comprises at least one another UEs, except to the UE, connected to at least one another second BS with the first BS, and
wherein a pattern information assigned to the UE group is different from a pattern information assigned to the at least one another UE group.

4. A user equipment (UE) for processing system information (SI) in a wireless communication system, the UE comprising:
a transceiver; and
a controller configured to control the transceiver and configured to:
receive, from a first base station(BS), information indicating a change of a SI of at least one second BS and an identifier related to the at least one second BS, the at least one second BS providing dual connectivity (DC) to the UE together with the first BS;
identify, by the UE, the change of the SI of at least one second BS based on the information; and
receive, from the at least one second BS, the SI of the at least one second BS corresponding to the identifier.

5. A user equipment (UE) for processing system information (SI) in a wireless communication system, the UE comprising:
a transceiver; and
a controller configured to control the transceiver and configured to:
receive, from a first base station (BS), pattern information related to a predetermined time period, wherein the pattern information is mapped to a second BS, the second BS providing dual connectivity (DC) to the UE together with the first BS;
receive, from the first BS, first information indicating a change of a SI of second BS within the predetermined time period, based on the pattern information; and
receive the SI of the second BS based on the first information.

6. The UE of claim 5,
wherein UE group comprises UEs, including the UE, connected to the second BS with the first BS,
wherein at least one another UE group comprises at least one another UEs, except to the UE, connected to at least one another second BS with the first BS, and
wherein a pattern information assigned to the UE group is different from a pattern information assigned to the at least one another UE group.

* * * * *